T. C. PRATT & H. J. S. LEWIS.
Feathering Paddle-Wheel.
No. 225,999                    Patented Mar. 30, 1880.
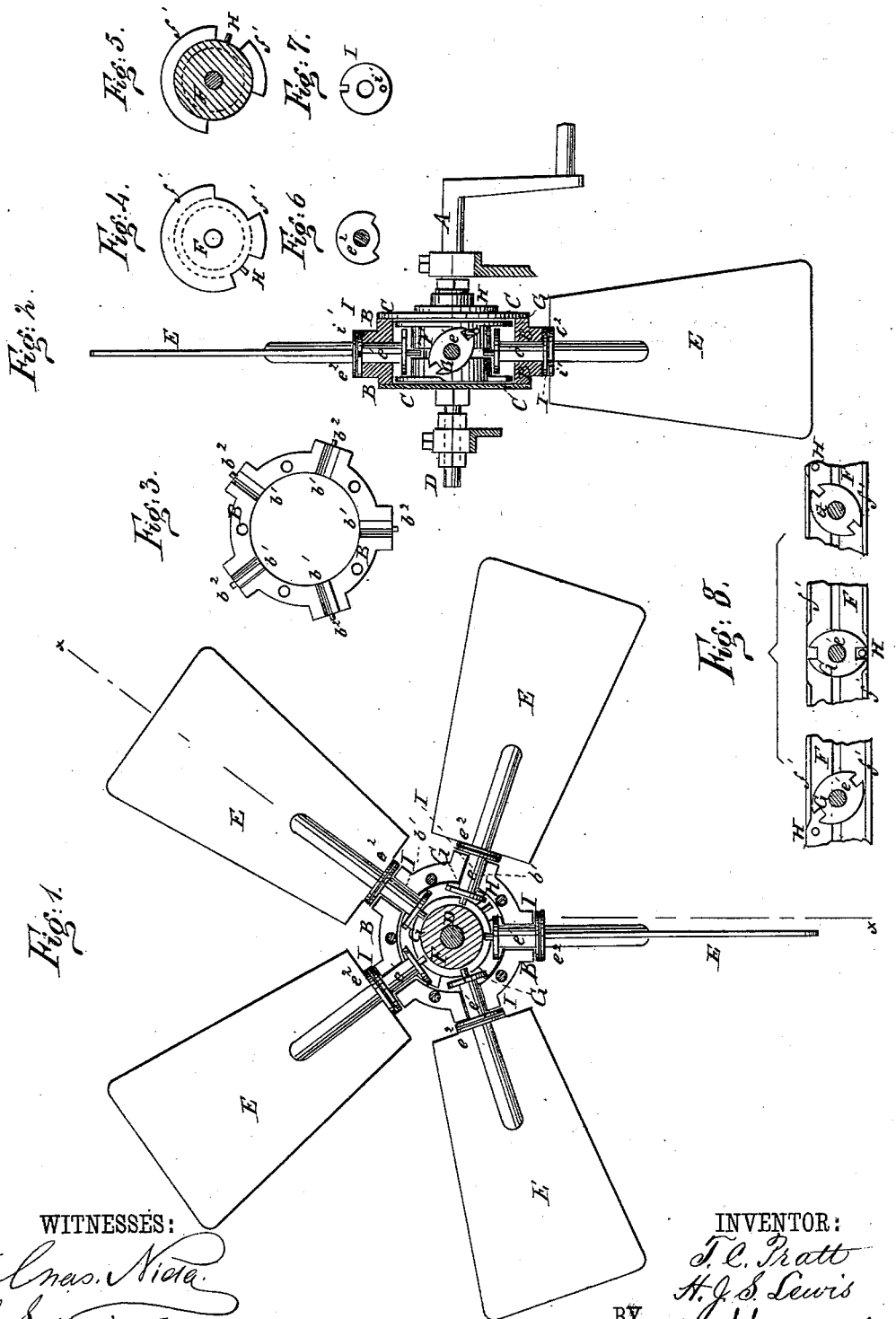

UNITED STATES PATENT OFFICE.

THOMAS C. PRATT AND HERMAN J. S. LEWIS, OF GRAFTON, NEW YORK.

FEATHERING PADDLE-WHEEL.

SPECIFICATION forming part of Letters Patent No. 225,999, dated March 30, 1880.

Application filed September 4, 1879.

*To all whom it may concern:*

Be it known that we, THOMAS CHOATE PRATT and HERMAN J. S. LEWIS, of Grafton, in the county of Rensselaer and State of New York, have invented a new and useful Improvement in Feathering Paddle-Wheels, of which the following is a specification.

Figure 1 is a side view of our improved paddle-wheel, partly in section to show the construction. Fig. 2 is a cross-section of the same, taken through the broken line $x\ x$, Fig. 1. Fig. 3 is a detail side view of one part of the wheel-hub. Figs. 4, 5, 6, and 7 are detail views of the parts that control the movements of the paddles. Fig. 8 shows the different positions of the notched elliptical plates.

The object of this invention is to furnish paddle-wheels which shall be so constructed that the paddles will adjust themselves automatically to bear equally against the water when moving through one part of the revolution and edgewise when moving through the other part of the revolution, so that the most of the power may be utilized for the propulsion of the vessel.

The invention consists in the combination of the rotating hub, the stationary hub provided with the ring-groove, the notched flanges, and the pins, the elliptical plates provided with notches in their ends, and the stationary shaft or sleeve, with the wheel-shaft and the paddles provided with the shanks; and in the combination of the pins, the washers provided with the notches or holes and the pins, and the notched disks, with the hub and the paddles and their shanks, as hereinafter fully described.

Similar letters of reference indicate corresponding parts.

A represents the wheel-shaft, which revolves in bearings connected with the frame-work of the vessel, and to the outer end of which is attached the hub of the wheel. The hub is formed of two rings, B, and two side plates or disks, C, which are securely bolted to each other. One of the side plates, C, is securely attached to the shaft A, so that the said shaft may carry the hub B C with it in its revolution. The other side plate, C, revolves upon a stationary shaft, D, attached to a bar or bracket connected with the frame-work of the vessel. If desired, the shaft D may be made in the form of a sleeve placed upon the shaft A and secured to the bearings or support of the said shaft A.

In the adjacent faces of the rings B are formed radial half-round notches, $b'$, to form bearings for the shanks $e'$ of the paddles E. The inner ends of the shanks $e'$ enter a ring-groove formed around the hub F, which is stationary, and is attached to the shaft or sleeve D. Upon the shanks $e'$, near their ends, are formed, or to them are attached, elliptical or oval plates G, in the ends of which are formed notches to receive pins H, attached to the stationary hub F. Upon the ends of the hub F are formed flanges $f'$, at a distance apart a little greater than the width of the plates G and a little less than their length, so that the said plates cannot turn when between the said flanges $f'$. Two pins, H, are used, which are attached to the hub F upon the opposite sides of its groove, and in such positions as to turn the paddles E at the desired points.

In each flange $f'$, directly opposite each pin H, is formed a short notch, and in the opposite flange $f'$ is formed a longer notch, as shown in Figs. 4, 5, and 8. With this construction, as the plates G are carried around the hub F their notched forward ends engage with the pins H and are stopped, and the continued advance of the hub B C causes that end to swing into the short notch in the flange $f'$ and the other end to swing through the longer notch in the opposite flange $f'$, turning the paddles E a quarter of a revolution. At the next pin H this movement is reversed, bringing the paddles to their former positions.

The pins and flanges may be arranged to turn the paddles at any desired points of their revolution.

The movement of the paddles E is limited by the washers I, through which the shanks $e'$ pass, and which rest upon shoulders formed upon the rings B of the movable hub. The washers I are kept from turning by pins $b^2$, attached to the rings B, and which enter holes or notches in the said washers. The washers I have pins $i$ attached to their outer sides, and which enter notches in the disks $e^2$, attached to the inner ends of the paddles E, the said notches being made of such a length as to allow the said paddles to turn through only a quarter of a revolution.

With this construction the wheels may be arranged for the paddles to enter the water to any desired depth, or they may be wholly submerged, as may be desired.

With this construction, also, any desired number of paddle-wheels may be used, and they may be connected with any desired part of the vessel.

Having thus fully described our invention, we claim as new and desire to secure by Letters Patent—

1. The combination of the hub B C, the stationary hub F, provided with the ring-groove, the notched flanges $f'$, and the pins H, the elliptical plates G, provided with notches in their ends, and the stationary shaft or sleeve D, with the wheel-shaft A and the paddles E, provided with the shanks $e'$, substantially as herein shown and described.

2. The combination of the pins $b^2$, the washers I, provided with the notches or holes and the pins $i'$, and the notched disks $e^2$, with the hub B C and the paddles E and their shanks $e'$, substantially as herein shown and described.

THOMAS CHOATE PRATT.
HERMAN J. S. LEWIS.

Witnesses:
R. S. F. WAITE,
NATHAN L. HAKES,
GILMON P. MATTESON.